Figure 1:
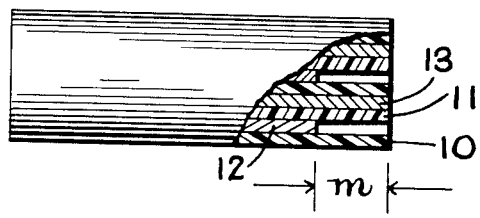

March 12, 1957 P. H. NETHERWOOD 2,785,352
ELECTRICAL CAPACITORS
Filed Jan. 27, 1953

INVENTOR.
PAUL H. NETHERWOOD
BY
Connolly and Hutz
HIS ATTORNEYS

United States Patent Office 2,785,352
Patented Mar. 12, 1957

2,785,352

ELECTRICAL CAPACITORS

Paul H. Netherwood, Williamstown, Mass., assignor to Sprague Electric Company, North Adams, Mass., a corporation of Massachusetts Application January 27, 1953, Serial No. 333,516

8 Claims. (Cl. 317—260)

This invention relates to improved electrical capacitors and more particularly refers to capacitors employing plastic film dielectrics.

Numerous types of rolled capacitors are known and used throughout the electronic and electrical component industry. One old type which has become of greater immediate importance is the plastic film dielectric capacitor. Numerous methods of terminating and housing such capacitors have been proposed and to the best of my knowledge none of these combines the desired characteristics such as physical strength, electrical utility, low cost, etc. without also being subject to one or more of the disadvantages generally associated with such plastic film type capacitors.

It is an object of the present invention to overcome the foregoing and related disadvantages. A further object is to produce new and useful electrical capacitors. A still further object is to produce new uncased, stable dielectric film capacitors. Additional objects will become apparent from the following description and claims.

These objects are attained in accordance with the present invention wherein there is produced an electrical capacitor comprising two convolutely wound electrode foils separated by thermoplastic dielectric films, one of said foils extending from one side edge of the winding to a marginal location near but spaced from the other side edge of the winding, the other of said electrode foils being disposed in opposite manner, terminal members being permanently affixed to each edge of the winding by embedment of a terminal wire in a conglomerate mass of the dielectric of said film and said foil, the resistivity of said mass not exceeding a value of about 2 ohm-cm.

In a more restricted sense the invention is concerned with an electrical capacitor comprising two aluminum electrode foils convolutely wound and separated by normally planar oriented thermoplastic polyester dielectric films, said foils being of substantially less width than said dielectric films, one of said foils extending to one edge of said films and the other of said foils extending to the other edge of said films, the ratio of thickness between the foils and dielectric spacing films being from about 1:1 to 0.2:1. Terminal wires are embedded in the edges of the winding, which edges comprise a mixed mass of aluminum foil and disoriented polyester resin.

In one of its limited embodiments the invention is concerned with the capacitor corresponding to the above description in which the polyester is the substantially linear condensation production of terephthalic acid and ethylene glycol.

According to my invention I have discovered a remarkably strong and permanent capacitor structure including terminal elements in its unitary assembly, while obviating the use of solder, welded joints and the like. My capacitors are essentially, in their finished state, extended foil type constructions terminated substantially uniformly to a wire or other terminal element through a rigid and tough high conductivity mass consisting of a dispersion of from about two parts to about ten parts of metal for every ten parts of disoriented thermoplastic resin. This construction will stand all the temperature to which the capacitor itself may be subjected and indeed has considerably more mechanical rigidity than the usual types of extended foil or tab terminal arrangements. In addition it makes possible the manufacture of uncased capacitors, that is capacitors with no separate or external housing; and which are not subject to deterioration even under relatively extreme atmospheric conditions, such as for example conditions met in the tropical sections of the earth. This is in contrast to the effect of humidity on similar dielectric capacitors in which the tab terminals are merely welded or soldered to a lead wire.

Figure 2:
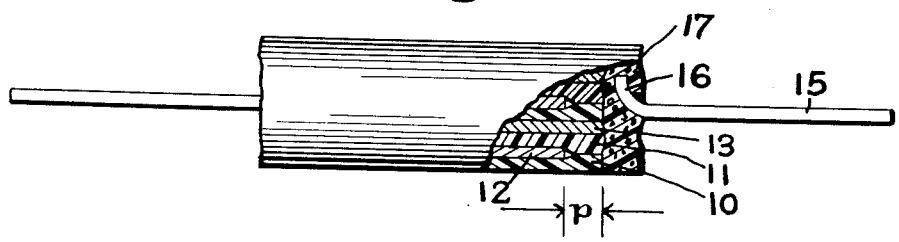
Figure 3:
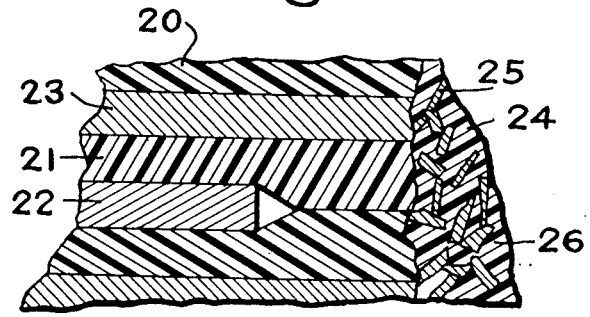

Reference is made to the appended drawing in which Figure 1 shows a cutaway view of a partially finished capacitor of the invention, Figure 2 shows a partially cutaway view of a finished capacitor of the invention, and Figure 3 shows an enlarged representation of one of the terminal bond assemblies.

Referring more specifically to Figure 1 there is shown a partially cutaway view of a semi-finished capacitor prior to the attachment of terminals thereto. At 10 and 11 there are represented dielectric spacers separating and convolutely wound with electrode foils 12 and 13. It will be noted that the electrode foil 13 extends to one edge of the winding along with dielectric spacers 10 and 11 whereas electrode foil 12 is separated from that edge of the winding by a distance shown as "$m$." Although not shown in the drawings, on the opposite end of the capacitor, it is the electrode 12 which extends to the edge of the winding and it is the electrode 13 which is spaced therefrom.

In Figure 2 is shown again a cutaway view of the appearance of the capacitor after application of the terminal assembly. Terminal wire 15 is completely embedded at a looped portion 16 in bonding mass 17 which consists of particles of the electrode foils 12 and 13 dispersed in a disoriented matrix of resin from dielectric spacers 10 and 11. It will be noted in Fig. 2 that dielectric spacers 10 and 11 extend into mass 17 along with terminated electrode foil 13. Electrode foil 12 of opposite polarity is now separated from the conducting mass 17 by a distance $p$ which is substantially less than distance "$m$" shown in Figure 1.

Such a terminal assembly is shown in enlarged view of Figure 3. Here dielectric spacers 20 and 21 separate convolutely wound electrode foils 22 and 23. The application of heat and a limited amount of pressure, with the temperature of treatment of the terminal portion being substantially above the melting point of said resin, the dielectric spacers 20 and 21 and the outside edge of electrode foil 23 are converted into a conducting tough rigid mass 24 which is actually made up of pieces of electrode foil 25 bonded together and integrally attached to both terminal and electrode by means of resin 26 obtained through conversion of the dielectric spacers 20 and 21.

In a typical instance a capacitor was wound with electrode foils .00017" in thickness using two 0.00025" spacers of the oriented polyester film obtained from the condensation product of ethylene glycol and terephthalic acid. Both electrode foils were narrower than the dielectric spacers, with one extending to one side edge of the winding and with a margin of .25" separating it from the other edge of the winding. The other electrode foil was disposed in the opposite sense, in each case the distance "$m$" being .25". The capacitor was treated for capacitance stability for one-half hour at 207° C. and then provided with terminal wires. In this process the terminal wire was heated to 250° C. immediately before application to the end of the capacitor winding and then applied directly to the latter. Since the melting point of the polyester is less than 250° C. the terminal wire and loop thereof could be forced down into the edge of the winding for a distance of about .13". Following this a hot iron with a surface temperature of approximately 250° C. was applied to the edge of the winding with the plane of the iron being perpendicular to the axis of the condenser, with the condenser being turned to intermix the extended electrode foil and dielectric spacers into a conducting mass which covered the end of the capacitor and the looped portion of the terminal substantially completely. Upon removal of the iron the disoriented plastic froze into its final rigid state providing a permanent terminal bond.

While this capacitor could be operated without further treatment or casing at normal and even elevated temperatures, for example up to 200° C., it was also found possible to mold it successfully in thermosetting and thermoplastic resin housings, provided that the temperature involved in the molding or casting of the resin did not exceed about 210° C.

While the example was directed to the use of the polyester known commercially as "terylene" it was also applicable to many other dielectric films which are thermoplastic in nature for example polystyrene and substituted derivatives thereof, polyvinyl carbazole, polybutadiene ethyl cellulose, cellulosetriacetate, cellulose acetate-sorbate and many other resins which have a transition to a molten or plastic state at elevated temperatures.

The thickness of the dielectric films should be from about .1 to about 2 mils total between each electrode with the usual working range of from about .0002" to about 1 mil.

The electrode foil as previously indicated should possess a thickness relative to said dielectric films from about 20 percent to about 100 percent of the thickness of the latter.

The electrode foil may be made of aluminum, tin, silver, copper or similar metals and indeed may consist of a thick evaporated coating rather than a discreet and separate electrode foil, providing that the ratio referred to above is maintained.

It should be noted that the final capacitor when properly produced consists of an active capacitor winding in which the dielectric film is oriented (if it were in this state originally) whereas the end portions consist of the same constituent in a highly disoriented state. The high frequency characteristics of the construction have been found to be particularly outstanding.

As an alternate method of attaching a terminal assembly to the capacitor winding, useful results can be obtained by spraying the end of the initial winding with very hot particles of metal chemically corresponding to or capable of alloying and bonding to the material of which the electrode foils are selected.

What I claim is:

1. An electrical capacitor comprising a plurality of margined electrodes separated from one another by dielectric resin spacers between about 0.1 and 2 mils thick, said electrodes not extending beyond the edge of said spacers, said capacitor having oppositely disposed end leads with looped contacts each embedded in a different conglomerate mass of the peripheral portions of the respective electrodes and said resin, said electrodes having a thickness between about 20 and 100% of the spacer thickness and the masses having a resistivity no higher than about 2 ohm-centimeters to electrically connect said electrodes to said end leads while sealing the connections against exposure.

2. The capacitor of claim 1 wherein said resin spacers are oriented thermoplastic resin material, and wherein the resin extensions in said end seal masses is disoriented.

3. The capacitor of claim 2 wherein the resin is a polyester of ethylene glycol and terephthalic acid.

4. An electrical capacitor comprising two electrodes separate from each other and convolutely wound with resin spacers between about 0.1 and 2 mils thick, the electrodes having a thickness between about 20 and 100% of the spacer thickness and being narrower than the spacer, the respective electrodes having one side edge extending to opposite sides of the winding and the other side edges recessed from the other side of the winding, separate terminal leads having looped contact ends positioned against the opposite sides of the winding and anchored in place by a flowed electrically conductive conglomerate mass of an extension of the resin spacers and fragments of the peripheral portion of the respective electrode.

5. A method of making a capacitor which comprises the steps of assembling dielectric fusible resin spacers having a thickness between about 0.1 and 2 mils, with electrodes having a thickness between about 20 and 100% of the spacer thickness into a capacitive assembly having opposing terminal portions in each of which a different one of the respective electrodes is spaced from the edge of the assembly, placing a looped end of a different terminal lead in contact with the respective opposing terminal portions, heating and deforming these portions to flow the resin and disrupt the electrode margins to form electrically conductive conglomerate masses covering and electrically connecting their electrodes to the looped ends, and cooling the masses to set the resin and permanently seal and anchor the connections.

6. The invention of claim 5 in which the looped lead ends are above the temperature at which the resin flows when these portions are set in place.

7. The invention of claim 6 in which the looped lead ends are pressed into the terminal portions when placed in contact with them.

8. A method of making a capacitor which comprises the steps of convolutely winding electrodes with fusible resin spacers having a thickness of about 0.1 to 2 mils, the electrodes having a thickness between about 20 and 100% of the spacer thickness, and being narrower than the spacers and in offset relationship with respect to each other with the different electrodes having their side edges extending to the opposite sides of the winding, placing a looped end of different terminal leads in contact with the respective side edges, heating and deforming these side edges to cause the marginal resin portions to flow and the marginal portions of the electrodes to be separately fragmented and mixed with the flowed resin to form electrically conductive masses covering and electrically connecting the respective electrodes to the separate terminal leads, and cooling the assembly to set the resin in the flowed mixtures and permanently seal the connections in anchored relationship.

References Cited in the file of this patent

UNITED STATES PATENTS

| | | |
|---|---|---|
| 2,470,045 | Nagy | May 10, 1949 |
| 2,497,376 | Swallow | Feb. 14, 1950 |
| 2,527,373 | Parson | Oct. 24, 1950 |
| 2,548,862 | Brandt | Apr. 17, 1951 |
| 2,627,645 | Harris | Feb. 10, 1953 |
| 2,651,100 | Grouse | Sept. 8, 1953 |

FOREIGN PATENTS

| | | |
|---|---|---|
| 563,500 | Great Britain | Aug. 17, 1944 |